March 30, 1943.  E. W. LOGAN ET AL  2,314,999
MOTOR
Filed Oct. 9, 1939  2 Sheets-Sheet 1
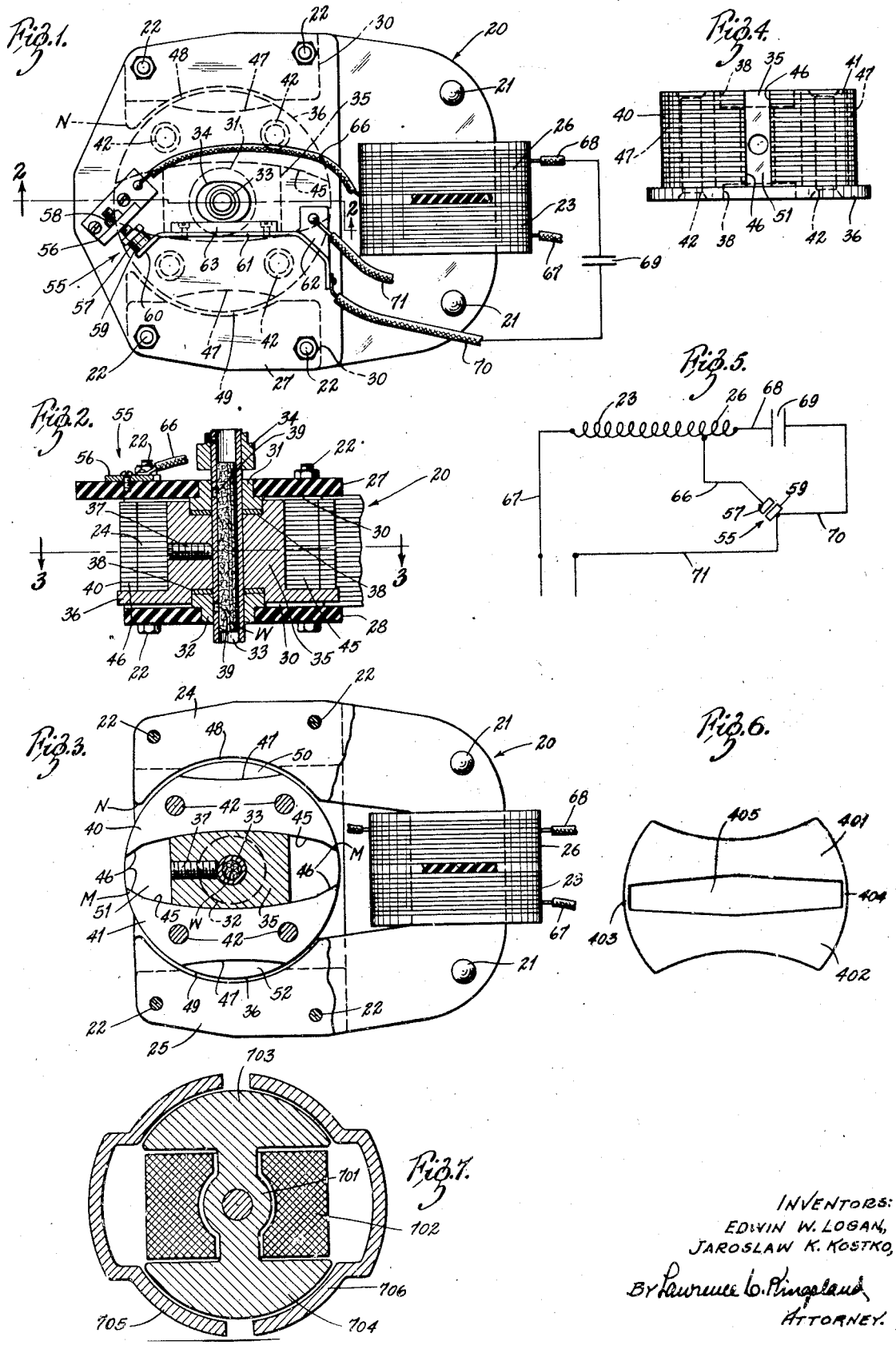
INVENTORS:
EDWIN W. LOGAN,
JAROSLAW K. KOSTKO,
By Lawrence C. Kingsland
ATTORNEY.

March 30, 1943.  E. W. LOGAN ET AL  2,314,999

MOTOR

Filed Oct. 9, 1939  2 Sheets-Sheet 2

INVENTORS
EDWIN W. LOGAN,
JAROSLAW K. KOSTKO,
BY Lawrence C. Kingsland
ATTORNEY.

Patented Mar. 30, 1943

2,314,999

UNITED STATES PATENT OFFICE 2,314,999

MOTOR

Edwin W. Logan, Belleville, Ill., and Jaroslaw K. Kostko, University City, Mo., assignors to The Emerson Electric Mfg. Co., St. Louis, Mo., a corporation of Missouri Application October 9, 1939, Serial No. 298,598

10 Claims. (Cl. 172—36)

The present invention relates to impulse electric motors.

The principal objects of this invention are to provide a motor of this type which may attain very high speeds with low consumption of power, and a small amount of material; and which may be easily started and take its load without excessive decrease in speed.

Specifically, an object of the invention is to produce an impulse motor having a minimized reverse torque.

The motor may be of a size as used in such applications as electric razors. It includes, broadly, a field member carrying a winding which may be energized by either direct or alternating current, a rotor without any winding, but with a special arrangement of parts of high and low permeability, a switch of unique design for making and breaking the current applied to the field winding and hence the magnetic flux through the rotor, and a circuit including a coil and a condenser to be connected across the switch for the purpose of decreasing the intensity of the spark between the contacts of the switch at the instant of breaking the current, and accelerating the decay of the magnetic flux.

In the drawings:

Fig. 1 is a plan view of a preferred embodiment of the invention;

Fig. 2 is a section on the line 2—2 of Fig. 1;

Fig. 3 is a view similar to Fig. 1, but partly broken away as shown at the line 3—3 of Fig. 2;

Fig. 4 is an edge view of the rotor;

Fig. 5 is a circuit diagram for the motor;

Fig. 6 is a face view of a modified type of rotor;

Fig. 7 is a view of a motor having the winding on the rotor instead of the field;

Figure 8:
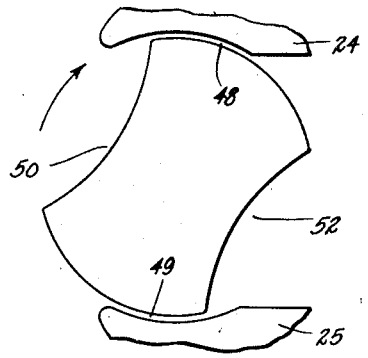

Figs. 8, 10, 12, and 14 are views in successive positions of a conventional rotor of an impulse motor; and, Figs. 9, 11, 13, and 15 are views corresponding, respectively, to Figs. 8, 10, 12, and 14, but showing the new rotor.

The field member 20 is made up of U-shaped iron laminations held together by rivets 21, and additionally secured by bolts 22. On the bight portion of the field member 20 is a winding 23 that, when energized, sets up a magnetic flux producing poles 24 and 25. The field member 20 also carries a winding 26 for a purpose to be described.

The opposite sides of the poles have cover plates 27 and 28, preferably made of some nonmagnetic and electrically nonconducting material, and secured in place by bolts 22. Spacer members 30 on opposite sides of each pole are interposed between the pole sides and the cover plates 27 and 28.

Between the poles, the two plates 27 and 28 have central bearings 31 and 32. These bearings receive a hollow shaft 33, at one end of which there is secured a cam 34 for a purpose to be described.

An armature hub 35 of some nonmagnetic material has integrally therewith (or integrally secured thereto) a plate 36, likewise of nonmagnetic material, and is mounted on the hollow shaft. A set screw 37 is threaded into the hub portion 35 and, as will be seen, determines the angular position of the rotor relative to the shaft and, therefore, relative to the cam 34.

The hub is provided with oil pockets 38, and holes 39 pass through the shaft into bearing areas. Contained in the hollow shaft 33 is an oil retaining wicking W for the purpose of lubricating the bearings 31 and 32 through the holes 39.

The rotor plate 36 serves as a support for elongated magnetic conductors 40 and 41 of material such as iron laminations, which are riveted to it by the four rivets 42. The parts 40 and 41 are located on opposite sides of the hub element 35 on one side of the plate 36.

Each of the parts 40 and 41 has an inner face 45 that is arcuate except at the tips 46 where it approaches the opposite tips of the other parts somewhat more sharply. The outer face 47 is cut out somewhat concavely. As a result, the motor has air gaps 48 and 49 between the field poles 24 and 25 and the rotor, as well as spaces 50, 51, and 52 across the rotor itself, filled with a nonmagnetic substance that wholly or partly may be air. With clockwise rotation the edges M of the conductors 40 and 41 and the edges N of the poles 24 and 25 are termed leading edges.

The cam 34 operates a switch generally indicated at 55. It has a fixed terminal 56 on the plate 27 carrying a contact 57. the latter being adjustably supported by being threaded into an upstanding flange on the terminal 56. A lock nut 58 holds the contact in adjusted position. The second and movable contact 59 is supported on a bent end 60 of a switch blade 61 made of spring material. The blade 61 is fastened to a terminal 62 secured to the plate 27. A block 63 of insulating material is attached to the blade 61 to receive the cam action.

The windings include the field winding 23 and the auxiliary winding 26. The winding 23 is connected directly to the winding 26 and a lead 66 is brought out from this connection between the windings 23 and 26 to the fixed terminal 56 of the switch 55. A lead 67 connects the other or free end of the winding 23 to the supply line. A lead 68 connects the other or free end of the coil 26 to a condenser 69. The other terminal of the condenser 69 is connected to the terminal 62 and hence the movable contact 59 of the switch 55 by a lead 70. A lead 71 connects the movable contact 59 to the other supply line.

The free end 60 of the switch blade 61 is turned outwardly at an angle, for example 45°, to the main portion of the switch blade. Both contacts 57 and 59 are flat faced. The switch blade 61 moves under the action of the cam 34 twice each revolution of the rotor in a direction approximately at right angles to the main portion of the blade, thus making and breaking the circuit of the field winding twice each revolution of the rotor. The angularity produces a cushioning effect when the two contacts 57 and 59 close. There is also a wiping effect. These two effects prevent, respectively, bouncing of the contacts and fouling of them.

The winding 26 is wound co-directionally with the winding 23, so that, when the magnetic flux in the field member 20 is diminishing at the opening of the switch 55, the electro-motive forces induced by the variation of the flux in the windings 23 and 26 act in the same direction, charging the condenser 69. At the opening of the switch 55, at least part of the energy accumulated in the magnetic circuit while this switch is closed is transferred to the condenser 69. The winding 26 aids in this transfer, thus reducing sparking at the contacts of the switch 55 and accelerating the decaying of the magnetic field. To illustrate, the ratio between the windings 23 and 26 may have such a value as 1740:60.

Figure 11:
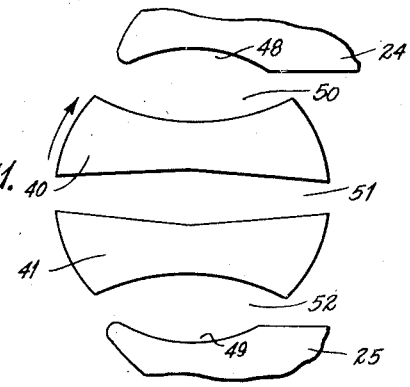
Figure 12:
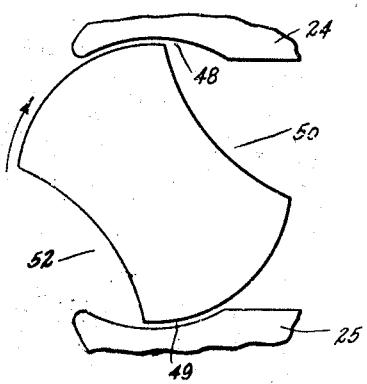
Figure 15:
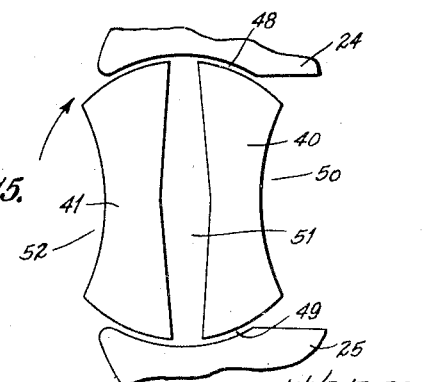

When the coil 23 is energized, magnetic flux passes from one field pole to the other, and at least a part of it passes through the rotor, producing magnetic poles of opposite polarity on the surfaces of the field and rotor members facing each other. It is known that in a position of the rotor such as Fig. 13 the action of the field poles on the rotor poles has a tangential component producing a torque which strives to move the rotor in the direction that results in decreasing the reluctance of the magnetic circuit—that is, clockwise toward the position of Fig. 15. In the positions of Figs. 11 and 15, the reluctance of the magnetic circuit is, respectively, maximum and minimum, and no torque is produced on the rotor. These positions may be termed "dead center" positions of the rotor.

Figure 9:
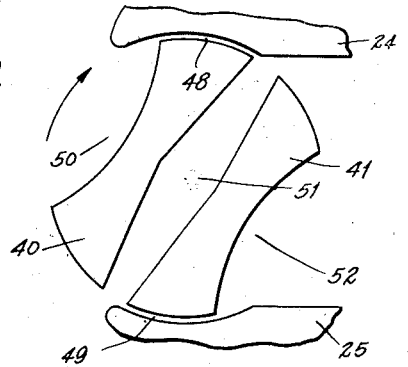

Beyond the position of Fig. 15, as in the position of Fig. 9, the rotor would also be urged toward the position of Fig. 15. In other words, the torque reverses at the dead center position and acts counterclockwise. A unidirectional rotation of the rotor, however, requires a unidirectional average torque. It is, therefore, necessary to minimize the reverse torque. This can be accomplished by proportioning and positioning the cam 34 in such a way as to break the circuit of the field winding and keep it open while the rotor moves through positions with respect to the field member in which magnetization would cause strong reverse torque.

Figure 13:
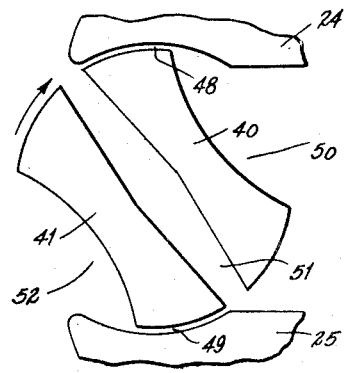
Figure 14:
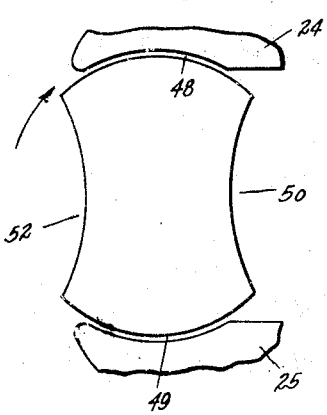

It can be seen that reverse torque is completely eliminated if the flux is produced in the field when the rotor is immediately beyond the position of Fig. 11, continues through intermediate positions such as shown in Fig. 13, and is reduced to zero when the rotor reaches the position of Fig. 15 (thus being effective during the first quadrant); and then remains at its zero value for the second quadrant, is produced again during the third quadrant, remains at zero for the fourth, and so on.

Ideally, the foregoing could be produced by operating the switch every 90° at the end of the designated quadrants. However, such an arrangement of switching operations results in a very unsatisfactory performance of the motors. Due to the presence of magnetic materials in the field and rotor members, the circuit of the field winding is highly inductive so that, when this circuit is closed by the action of the cam 34, the current rises to its maximum value, not at once, but gradually. In order to give it time to reach values producing a desired magnetization, even at high speeds for which motors of the impulse type are usually designed, it is found necessary to close the field circuit somewhat ahead of the position of Fig. 11, although a certain amount of reverse torque results from this advance of the circuit closing operation.

Figs. 8, 10, 12, and 14 show diagrammatically a motor with a conventional one-piece rotor (and hence devoid of the middle air gap 51), in several positions. Figs. 9, 11, 13, and 15 show the present two-piece rotor in corresponding positions, the external rotor dimensions being the same in both types.

Figure 10:
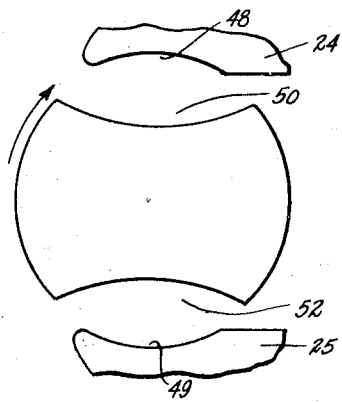

Considering first the rotor of the usual type, Figs. 8, 10, 12, and 14:

With clockwise rotation of the rotor, the circuit of the field winding may be closed at or about the instant shown in Fig. 8. It is known that at any instant the torque of the motor is proportional to the product of the rate of variation of the inductance of the field winding and the current in it. In Fig. 8, the inductance of the field winding is large because the magnetic flux has to cross only the very short air gaps 48 and 49, the reluctance of the iron parts of the magnetic circuit being usually small. In the position of Fig. 10, the inductance is, on the contrary, very small because of the large air spaces 50 and 52 as well as the air gaps 48 and 49 between the field member and the rotor. In short, the rate of variation of the inductance between the positions of Fig. 8 and Fig. 10 is high and, therefore, the torque, which in this quadrant is a reverse torque, is also high. In Figs. 9, 11, and 13, on the contrary, the inductance is very low and substantially constant throughout because here the reluctance of the magnetic circuit is due, to a large extent, to the long space 51, so that the total reluctance is not greatly changed from the position of Fig. 9 to that of Fig. 11. The substantial constancy and low value of the inductance implies a slow rate of change thereof and, therefore, a low value of reverse torque.

Furthermore, a low value of inductance permits a very rapid building up of the current when the circuit of the field winding is closed. Therefore, the advancing of the instant of closing the circuit with respect to the theoretically correct instant of Fig. 11 need not be very great. As the application of current to the field in advance of the position of Fig. 11 necessarily increases the reverse torque, this reduction of advance of the instant of closing the circuit with respect to the position of Fig. 11 further reduces the reverse torque, and the power of the motor is increased. It is found that good average torque at a prescribed speed is obtained if the circuit of the field winding is closed at such an instant that the current reaches its maximum value when the rotor is in approximately the position of Fig. 13 or slightly beyond.

Small motors of the impulse type are usually started by giving the rotor, by hand, a quick impulse in the direction of rotation. During this operation, the speed of the rotor is very low compared with its speed of many thousands of revolutions per minute at normal operation. Therefore, during starting, the process of building up of the current from zero to its maximum value is completed with the rotor position practically unchanged. With the rotor of the usual type, Fig. 8, this means that the current becomes very high during a rapid decrease of inductance from Fig. 8 to Fig. 10, and hence the reverse torque is strong and the motor is somewhat sluggish in starting. With the rotor built according to the invention, the reverse torque is low and the starting process is greatly improved.

An impulse electric motor's average torque depends upon the difference between the maximum and the minimum inductance of the field winding. In the motor built according to this invention, the maximum inductance can be increased by increasing the span of the poles (or polar arc) without, at the same time, increasing the minimum inductance because the nonmagnetic gap between the magnetic parts of the rotor, such as the gap 51, maintains low the amount of magnetic flux in the position of minimum inductance, Fig. 11.

When supplied with current from an alternating source of supply, an impulse electric motor has a tendency to lose some of its torque when the motor reaches a speed corresponding to synchronism, such as 3600 R. P. M. with a 60-cycle supply and a two-pole structure. This is a very serious disadvantage, since the motors of this type are generally designed to operate at very high speed, 8000 R. P. M. and higher. The cause of it, apparently, is as follows:

At strictly synchronous speed, any given value of the current repeats itself at definite positions of the rotor. Moreover, since the applied voltage alternates with crest and zero values displaced 90 electrical degrees, the same is approximately true of the current. Now, if it happens that high values of the current occur at positions of reverse torque, such as the interval between Figs. 8 and 10, or 9 and 11, the low values of it will correspond approximately to positions of direct torque between Figs. 12 and 14, or 13 and 15. This will obviously result in a reduction of the average torque per revolution. In a motor built according to this invention, the reverse torque is, to a large extent, eliminated. Accordingly, these motors are substantially free from the disadvantage of low torque at synchronism.

Using the analogy between the electric and magnetic circuits, it may be said that the distinguishing feature of the rotor built according to this invention is that, in the position of maximum inductance of the field winding, such as Fig. 15, the high permeability parts 40 and 41 are substantially "in parallel" with low permeability part 51 (which may be air or a hub of nonmagnetic material, etc.); while, in the position of minimum inductance (Fig. 11), the high permeability parts 40 and 41 are substantially "in series" with the low permeability part 51.

Fig. 6 shows schematically a rotor similar to that of Fig. 3 but with magnetic parts 401 and 402 connected together by means of bridges 403 and 404 integral with these parts. Such a rotor may conveniently be built up of iron laminations. If the bridges 403 and 404 are sufficiently thin, it will have approximately the same properties as the rotor of Fig. 3 because, in the position of Fig. 11, the bridges would become highly saturated and acquire the properties of a material of low permeability. In the position of Fig. 15, the bridges would be only moderately saturated and substantially all magnetic flux in the rotor would pass through the parts of high permeability 401 and 402; while, in the position of minimum inductance (Fig. 11), the flux in the rotor must cross at least some of the parts of low permeability, such as the saturated bridges 403 and 404 or the nonmagnetic space 405.

In the modification of Fig. 7, the winding has been applied to the moving member and the stator comprises the armature. The moving member 701 is wound at 702 to provide poles 703 and 704. Slip rings, or the like (not shown), may be employed to conduct electricity to the mobile winding. The stator is divided into two parts 705 and 706, which provide maximum inductance in the position of Fig. 7, and minimum at 90° thereto. In principle, the operation is the same as the main type. The term "field member" is intended to refer to the wound member, whether stator or rotor, and the term "rotor member" is intended to refer to the armature member, whether stator or rotor.

What is claimed is:

1. In an impulse electric motor, a field member carrying a field winding adapted to be connected to a supply, a rotor member adapted to rotate relatively to the field member and located so as to be traversed in any of its positions by at least a part of the magnetic flux set up by the field winding, this rotor member comprising a plurality of parts of high permeability held mechanically together but magnetically substantially insulated from one another, substances of low permeability located between the parts of high permeability of the rotor in such a way that in one position of the rotor with respect to the field member the parts of high permeability are substantially in parallel with the substances of low permeability with respect to the magnetic flux in the rotor set up by the field winding, while in another position of the rotor, which is ninety electrical degrees from the first position, the parts of high permeability are substantially in series with the substances of low permeability with respect to the magnetic flux in the rotor set up by the field winding, and means for making and breaking connections between the field winding and the supply, these means being arranged so as to operate at predetermined positions of the rotor member with respect to the field member.

2. In an impulse electric motor, a field member carrying a field winding adapted to be connected to a supply, a rotor member adapted to rotate relatively to the field member and located so as to be traversed in any of its positions by at least a part of the magnetic flux set up by the field winding, this rotor member comprising a plurality of parts of high permeability held mechanically together but magnetically substantially insulated from one another, substances of low permeability located between the parts of high permeability of the rotor in such a way that in one position of the rotor with respect to the field member the magnetic flux in the rotor set up by the field winding passes substantially only in parts of high permeability of the rotor, while in another position of the rotor, which is at ninety electrical degrees to the first position, substantially all flux in the rotor set up by the field winding crosses at least some of the substances of low permeability, and means for making and breaking connections between the field winding and the supply, these means being arranged so as to operate at predetermined positions of the rotor member with respect to the field member.

3. In an impulse electric motor, a field member carrying a field winding adapted to be connected to a supply, a rotor member adapted to rotate relatively to the field member and located so as to be traversed in any of its positions by at least a part of the magnetic flux set up by the field winding, this rotor member comprising a plurality of parts of high permeability held mechanically together but magnetically substantially insulated from one another, substances of low permeability located between the parts of high permeability of the rotor in such a way that in one position of the rotor with respect to the field member the parts of high permeability are substantially in parallel with the substances of low permeability with respect to the magnetic flux in the rotor set up by the field winding, while in another position of the rotor, which is ninety electrical degrees from the first position, the parts of high permeability are substantially in series with the substances of low permeability with respect to the magnetic flux in the rotor set up by the field winding, and means for making and breaking connections between the field winding and the supply, said means being adjusted for making said connections at such positions of the rotor with respect to the field member that the current in the field winding reaches its maximum value substantially at the instant when the rate of variation of inductance in the motor circuit is maximum.

4. In an impulse electric motor, a field member carrying a field winding adapted to be connected to a supply, a rotor member adapted to rotate relatively to the field member and located so as to be traversed in any of its positions by at least a part of the magnetic flux set up by the field winding, this rotor member comprising a plurality of parts of high permeability held mechanically together but magnetically substantially insulated from one another, substances of low permeability located between the parts of high permeability of the rotor in such a way that in one position of the rotor with respect to the field member the magnetic flux in the rotor set up by the field winding passes substantially only in parts of high permeability of the rotor, while in another position of the rotor, which is at ninety electrical degrees from the first position, substantially all flux in the rotor set up by the field winding crosses at least some of the substances of low permeability, and means for making and breaking connections between the field winding and the supply, said means being adjusted for making said connections at such positions of the rotor with respect to the field member that the current in the field winding reaches its maximum value substantially at the instant when the rate of variation of inductance in the motor circuit is maximum.

5. In an impulse electric motor, a rotor member, a shaft, and two parts of high permeability symmetrically opposite each other about the shaft to provide two parallel magnetic paths of high permeability through the rotor, the outer faces of the said parts of high permeability being substantially parallel to the inner faces, and means maintaining said two parts of high permeability at least substantially magnetically insulated from one another.

6. In an impulse electric motor, a field member carrying a field winding adapted to be connected to a supply, said field member having oppositely arcuately concave poles, a rotor member adapted to rotate with respect to the field member and including two parts of high permeability disposed substantially parallel across the rotor, to provide leading edges on the sides of the parts toward the rotor, and adapted to be the first parts of the pieces to approach the poles, said parts being held mechanically together but magnetically substantially insulated from one another, and means for making and breaking connections between the field winding and the supply, said means being adjusted for making said connections at such a position of the rotor with respect to the field member that the current in the field winding reaches its maximum value at the position of the rotor wherein its leading edges are adjacent to the leading edges of the said arcuately concave field poles.

7. In an impulse electric motor, a rotor member, a hub of material of low permeability, a plate of material of low permeability securely fastened to the said hub, a shaft therethrough, and two parts of high permeability secured to the said rotor plate opposite each other about the shaft to provide two parallel paths of high permeability through the rotor, and said two parts being at least substantially magnetically insulated from each other.

8. In an impulse motor, a field member and a rotor, means producing a magnetic flux in the field member for traversing the rotor, means for making and breaking the circuit to the field member according to positions of the rotor, the position of the rotor at which the circuit is made being ahead of the rotor position at which torque in the desired direction is produced, and therefore in a rotor position to produce reverse torque, and magnetic conducting means and reluctance means on the rotor disposed to conduct flux in a predetermined direction across the rotor and to provide reluctance to such flux in a direction at any substantial angle in electrical degrees from said direction adapted to produce a low rate of change inductance during such positions of reverse torque.

9. In an impulse electric motor, a field member, a main circuit connected to a power supply, a winding therein for the field member, means for making and breaking the connections between the field winding and the supply, an auxiliary circuit comprising an auxiliary winding on the field member, and a condenser in series therewith, the auxiliary winding being co-directional with the field winding in its magnetic action, and the auxiliary circuit being interconnected with the main circuit across the making and breaking means.

10. In an impulse motor, a field member having electrically opposite pole pieces, a rotor adapted to rotate between the pole pieces, flux conducting means disposed on the rotor with ends adapted to be disposed adjacent the pole pieces to provide a flux path across the rotor from pole piece to pole piece when the rotor is rotated into a position so disposing said ends, and reluctance means on the rotor dividing the conductors and their path of flux into a plurality of components, said conducting means and reluctance means being adapted to cause low permeability from pole piece to pole piece across the rotor when the rotor is in such positions that the flux must pass across said reluctance means.

EDWIN W. LOGAN.
JAROSLAW K. KOSTKO.